United States Patent [19]
Kelly et al.

[11] Patent Number: 6,098,780
[45] Date of Patent: Aug. 8, 2000

[54] TRACKING, PROPULSION AND BRAKING SYSTEM FOR BRIDGE TRIPPER/HOPPER CAR

[75] Inventors: Ronald R. Kelly, Poway; George M. Bernard, Chula Vista, both of Calif.

[73] Assignee: Terra Nova Technologies, Inc., El Cajon, Calif.

[21] Appl. No.: 09/131,265

[22] Filed: Aug. 7, 1998

[51] Int. Cl.[7] .......................... B65G 37/00; B61H 13/00; B61B 12/02; B61C 9/00
[52] U.S. Cl. .......................... 198/364; 198/585; 188/356; 104/246; 105/96.1
[58] Field of Search ..................... 198/364, 585; 188/33, 35, 38, 41, 162, 157, 158; 104/245, 246, 247; 105/163.1, 163.2, 96.1, 96

[56] References Cited

U.S. PATENT DOCUMENTS

| | | |
|---|---|---|
| 3,391,652 | 7/1968 | Lauber ................................ 104/247 |
| 3,648,617 | 3/1972 | Metzner et al. ..................... 104/94 |
| 3,791,491 | 2/1974 | Tickle ................................... 188/33 |
| 4,319,677 | 3/1982 | Kipper ................................ 198/585 |
| 4,934,761 | 6/1990 | Sauvageot et al. ............... 188/162 |
| 5,119,734 | 6/1992 | Schwarzkopf ..................... 198/332 |

*Primary Examiner*—Robert P. Olszewski
*Assistant Examiner*—Bryan Jaketic
*Attorney, Agent, or Firm*—Price & Gess & Ubell

[57] ABSTRACT

A tripper/hopper car rides on a conveyor via four wheel tires running on T-section rails, with respective hold down wheels riding adjacent the underside of the rails and respective caster side wheels riding adjacent the vertical edges of the T-rails. Each wheel tire is driven by a motor drive unit employing a shaft-mount gearbox with a motor brake that utilizes the reduction of the drive gearbox to increase the effective braking torque developed. A pair of caliper-type brakes is further provided for redundancy.

9 Claims, 6 Drawing Sheets

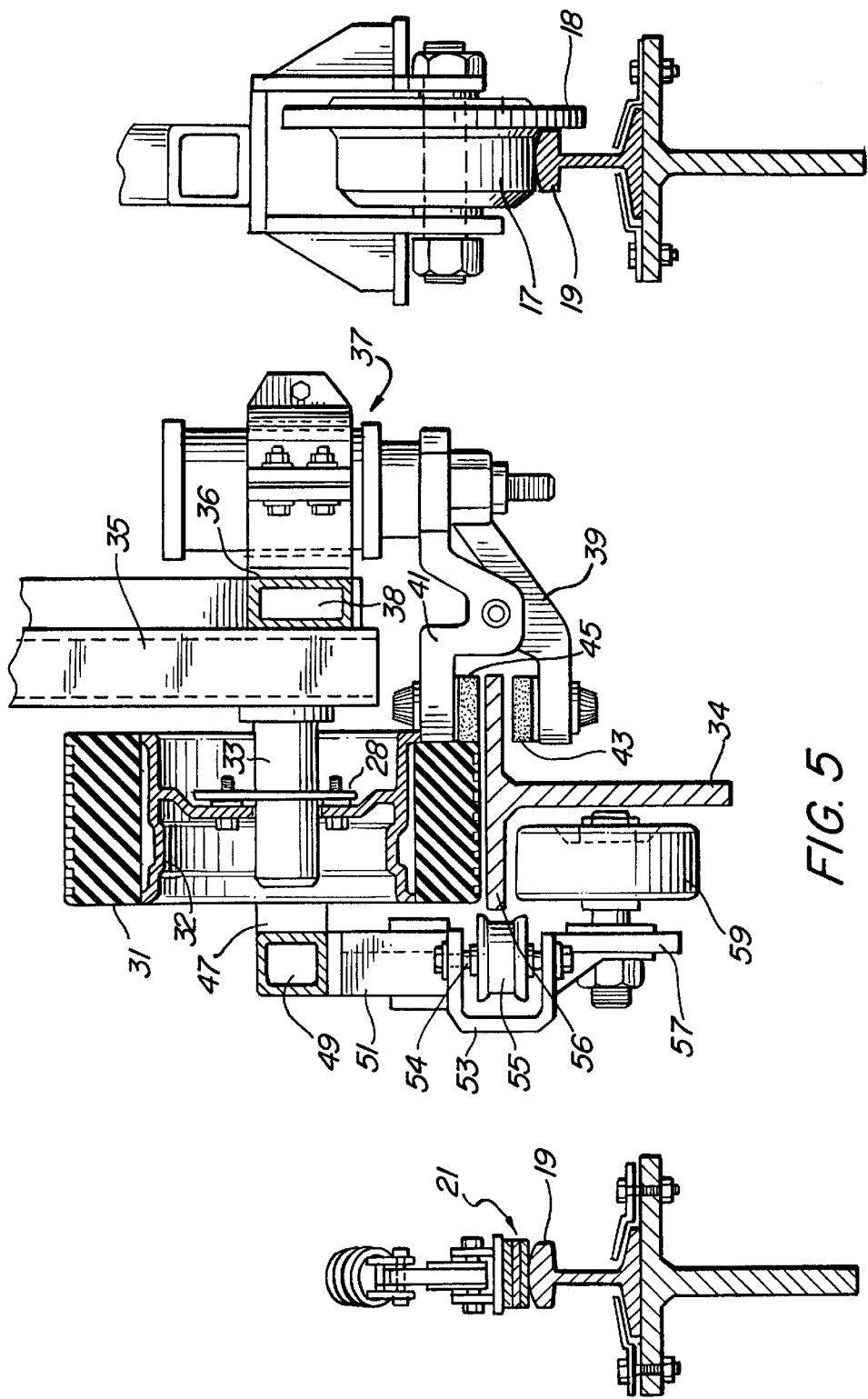

TRACKING, PROPULSION AND BRAKING SYSTEM FOR BRIDGE TRIPPER/HOPPER CAR

BACKGROUND OF THE INVENTION

1. Field of the Invention

The subjection relates generally to material moving apparatus and more particularly to improvements in belt trippers or hoppers which ride on a conveyor assembly.

2. Description of Related Art

A conventional belt tripper 11 is illustrated in FIG. 1. Such a belt tripper 11 typically travels up and down railroad tracks located on top of a long movable conveyor 13 as shown in FIG. 2. The tripper 11 functions to "trip" material off the long conveyor 13 to a short conveyor 15, which builds a stack of material 14. Apparatus known as "hoppers" are also similarly arranged to move up and down conveyors such as conveyor 13 to carry material along the conveyor. Trippers and hoppers of conventional design have exhibited numerous drawbacks.

First, conventional trippers/hoppers 11 ride on rail wheels 17, as shown in FIG. 3. Typical rail wheels 17 have a flange 18 running on the inside of the rail 19. These flanges 18 help guide and align the wheel 17 along the track, but are subject to derailment if the track is not even. This poses a serious safety concern: since it permits the tripper/hopper to derail, i.e., come off the top of the bridge 13.

Current equipment designs further use a pad type brake 21, FIG. 4, that applies pressure to the top of the rail 19, using the weight of the tripper/hopper car. This design is similar to the braking system used on old trolley cars. The amount of friction developed is proportional to the weight of the machine and the spring tension.

Current equipment designs use dual wire ropes running the length of the bridge 13 that wrap around capstans on the tipper/hopper. Propulsion of the tripper/hopper is achieved by powering the capstans. Several problems exist with this system. With wire rope (cables), stretch is experienced as tension is applied through the capstans. The tripper/hopper's mass, plus the differential forces produced by the belt tensions, have to be overcome or resisted by the wire ropes. Overcoming the wire rope's stretch produces a jerky propulsion movement.

In addition, since the tensions on the wire rope can become different from side to side, the resulting forces can create racking and potentially can derail the tripper/hopper. The same difficulty could be experienced if one of the cables breaks. As stated above, only the flanges of the rail wheels keep the current design on the rails, and if it derails, the brakes are useless.

SUMMARY OF THE INVENTION

According to the invention, wheels are placed on three sides of a wheel runway at each of four drive points. On the top of each drive point there is a drive wheel. On the underside of the runway is a holddown wheel. In addition, side wheels are provided for wheel system for alignment. This mechanism makes it virtually impossible for a tripper/hopper to come off the top of the bridge.

According to another inventive aspect, a motor and motor brake are placed on each of the four drivewheels of the tripper or hopper. The motor brake utilizes the reduction of a drive gearbox to increase the effective braking torque developed. Any one brake is designed to hold the machine.

The design is an "active" design, which provides increased safety factors and redundancy in the tracking system and the braking system. In addition, for added safety, a secondary "Fail Safe" brake system may be provided. The Fail Safe brake system incorporates two clamping type "rail" brakes to each tripper/hopper. Any time the propulsion system or power is turned off, the clamp brakes set and lock on the top chord of the bridge structure.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 3 is a fragmented cross sectional view illustrating a prior art belt tripper wheel mechanism;

FIG. 4 is a fragmented cross sectional view illustrating a prior art belt tripper brake mechanism;

FIG. 5 is a cross sectional view illustrating belt tripper tracking and braking apparatus useful according to the preferred embodiment.

DETAILED DESCRIPTION OF THE PREFERRED EMBODIMENTS

Figure 1:
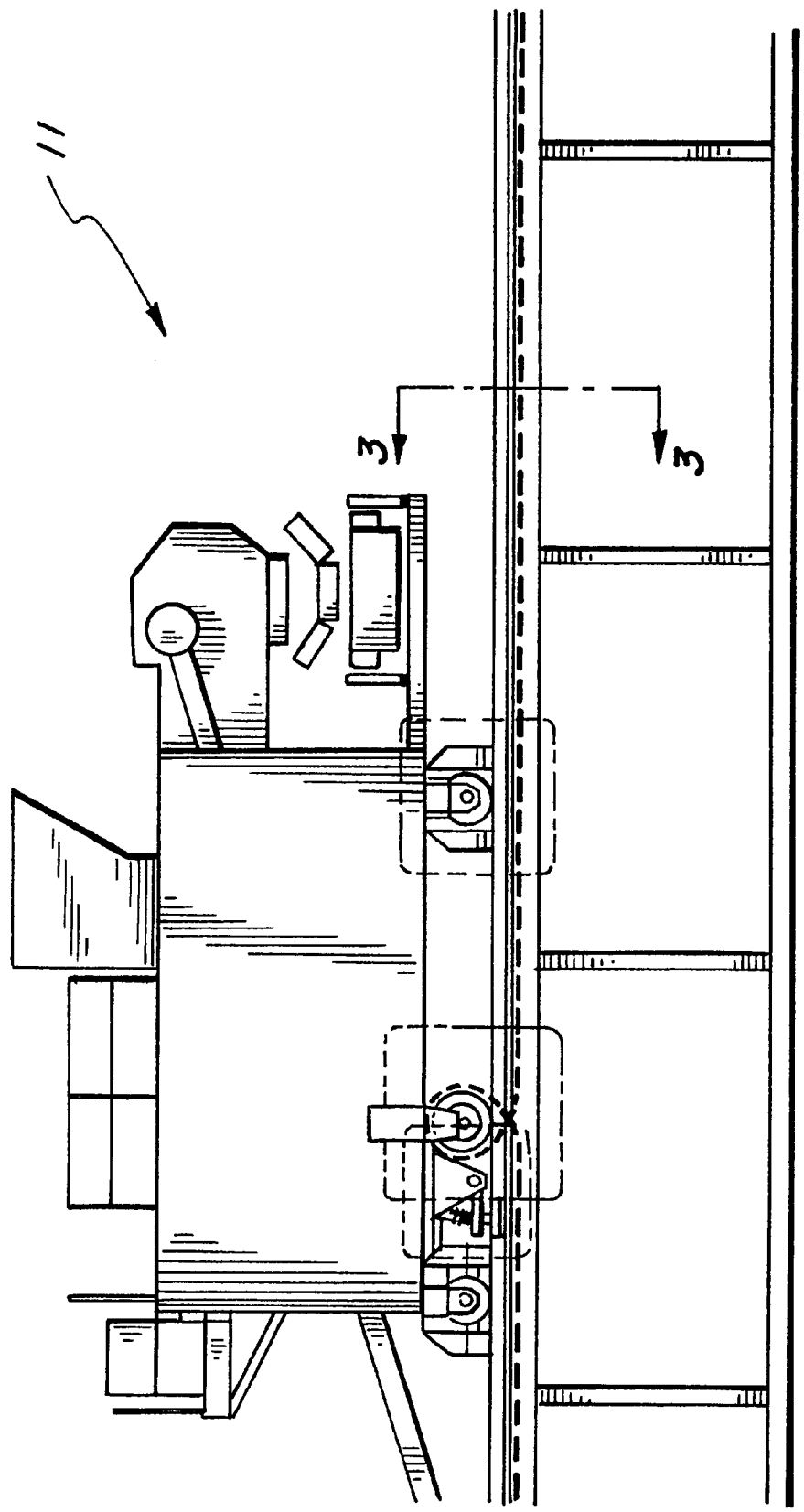
FIG. 1 is a side view outlining a prior art belt tripper.
Figure 2:
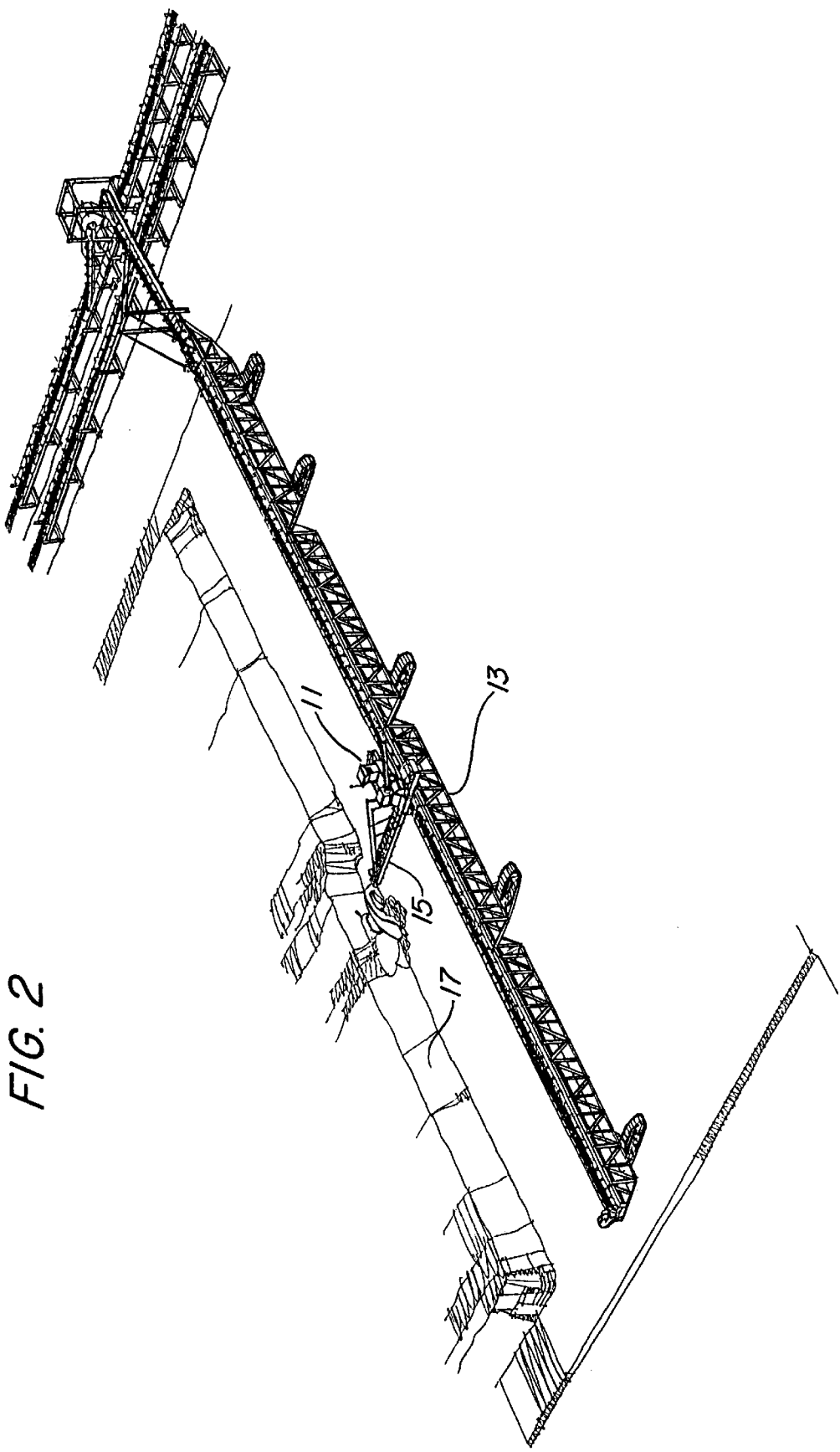
FIG. 2 is a perspective view illustrating an environment wherein a belt tripper may find use.

Certain preferred features of the improved tracking, propulsion and braking systems are shown in FIG. 5. These features include a wheel tire 31 riding on one of two structural T-section rails 34, which typically comprise the top chord of a bridge truss, e.g., FIG. 1. The wheel tire 31 is relatively wide and of a larger diameter than the conventionally used rail wheels. Such tires assist in negotiating uneven surfaces and provide ease of mobility.

The wheel 31 is mounted on a rim structure 32, which attaches to a plate 28 affixed to an axle 33. The axle 33 is journaled in a vertical support 35 to which the belt tripper superstructure including its cab are attached.

A hydraulic brake assembly 37 is further shown welded or otherwise attached to the vertical support 35 by means of a channel 36, which is angled 90 degrees, such that its hollow rectangular channel structure 38 is visible in FIG. 5. The brake 37 includes first and second calipers 39, 41 mounting respective first and second brakes shoes 43, 45. The brake assembly 37 then acts like a disc brake and provides a "Fail Safe" feature as described herein.

On the outside of the T-section 34 are mounted a caster guide wheel 53 and a hold down roller wheel 59. A piece of angled channel 47 extends around the wheel 31 and is welded or otherwise affixed to the support 35. A suspending post 51 suspends a u-shaped caster mounting bracket 53 wherein the caster wheel 55 is rotatably mounted on a vertically disposed shaft 54, such that wheel 55 rotates in a horizontal plane adjacent the vertical edge 56 of the T-section 34 and spaced apart therefrom.

Mounted beneath the bracket 53, either by attachment thereto or to post 51, is a strut 57 into which the roller wheel 59 is journaled. The roller wheel 59 is positioned immediately adjacent the underside edge of the structural T-member with a clearance of, for example, one-half inch. Such roller wheels 59 hold the belt tripper in position and preclude it from tipping off the track 34, while the caster guide wheel 55 further assists in holding the wheel tire 31 in place. With this construction it becomes highly improbable that the tripper will come off the bridge.

Figure 6:
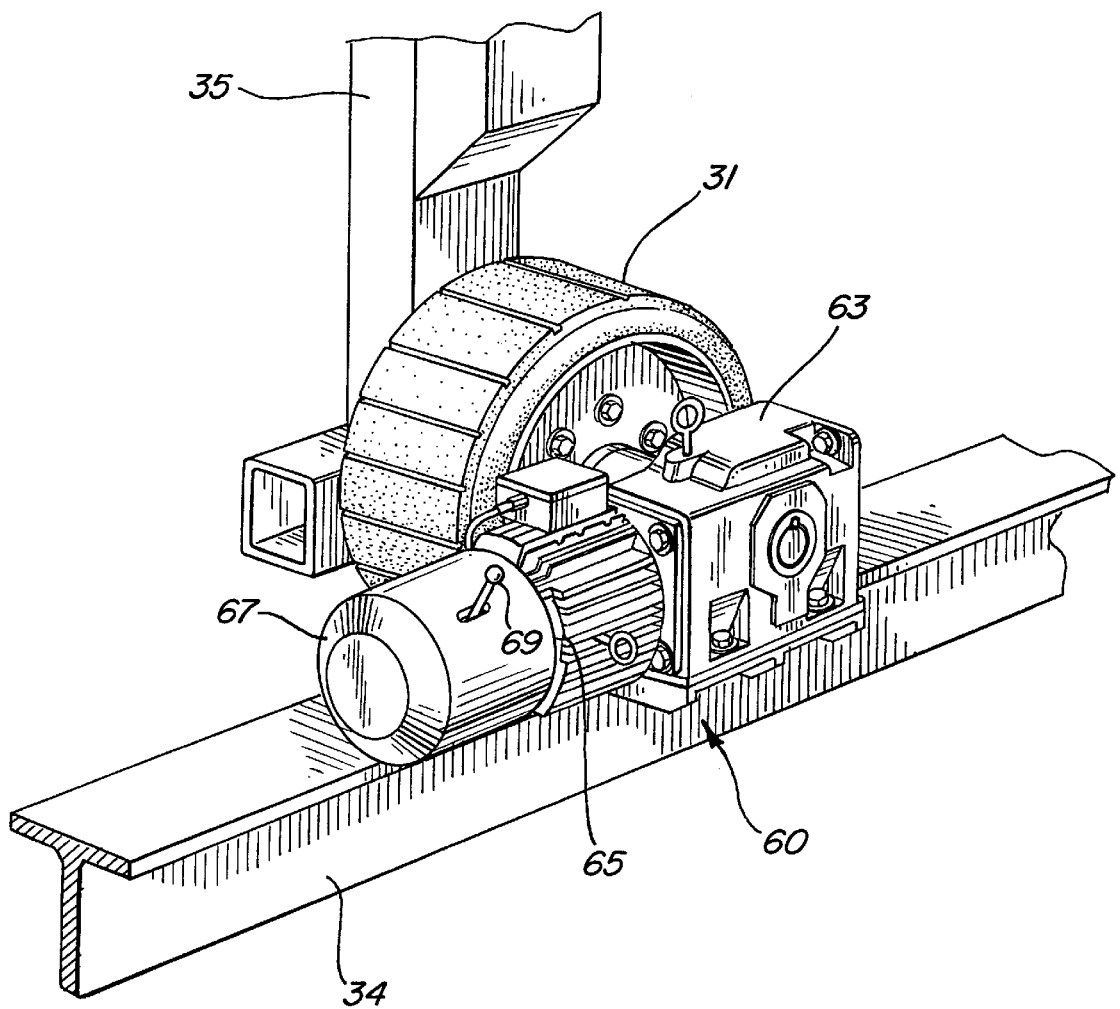
FIG. 6 is a perspective view illustrating a drive motor apparatus useful according to the preferred embodiment.

FIG. 6 illustrates the motor drive mount employed according to the preferred embodiment. As shown, an electric motor drive unit 60 is attached to drive each of the four wheel tires 31. The motor drive unit 31 includes a multi reduction, shaft-mounted gearbox 63, a motor 65 and an integral electric motor brake 67 with a Fail Safe, spring set electric release 69. The unit 60 is mounted to the wheel shaft 33 (FIG. 5) by means of a hollow shaft with shaft mount drive.

Thus, a motor brake 67 is provided on each of the four drive wheels 31. This brake utilizes the reduction of each drive gearbox 63 to increase the effective braking torque developed. Any one brake 67 is preferably designed to be sufficient to hold the machine. In order to increase the safety factor and redundancy of the braking system, each wheel drive incorporates an individual brake. For additional redundancy and safety, two hydraulic brakes 37 are provided. Any time the propulsion system or power are turned off, the Clamp Brake will set and lock onto the inside flange of the top chord of the bridge structure.

The electric motor drive units 60 preferably provide Variable Frequency Drives at all four wheels through a multi reduction gearbox to apply smooth, even propulsion to the tripper/hopper. Through use of state of the art electrical controls, the VFD's produce 100% torque throughout the frequency range of one to 50 hertz. The VFD allows the tripper/hopper to ramp up to travel speed smoothly and ramp down to a stop. The brakes then immediately set on each motor and the clamping brakes apply. The multiple output VFD controls and measures frequency and torque being applied to each drive motor. A main advantage of the motor drive system is that it provides a smooth propulsion system with the result that spills are minimized.

Figure 7:
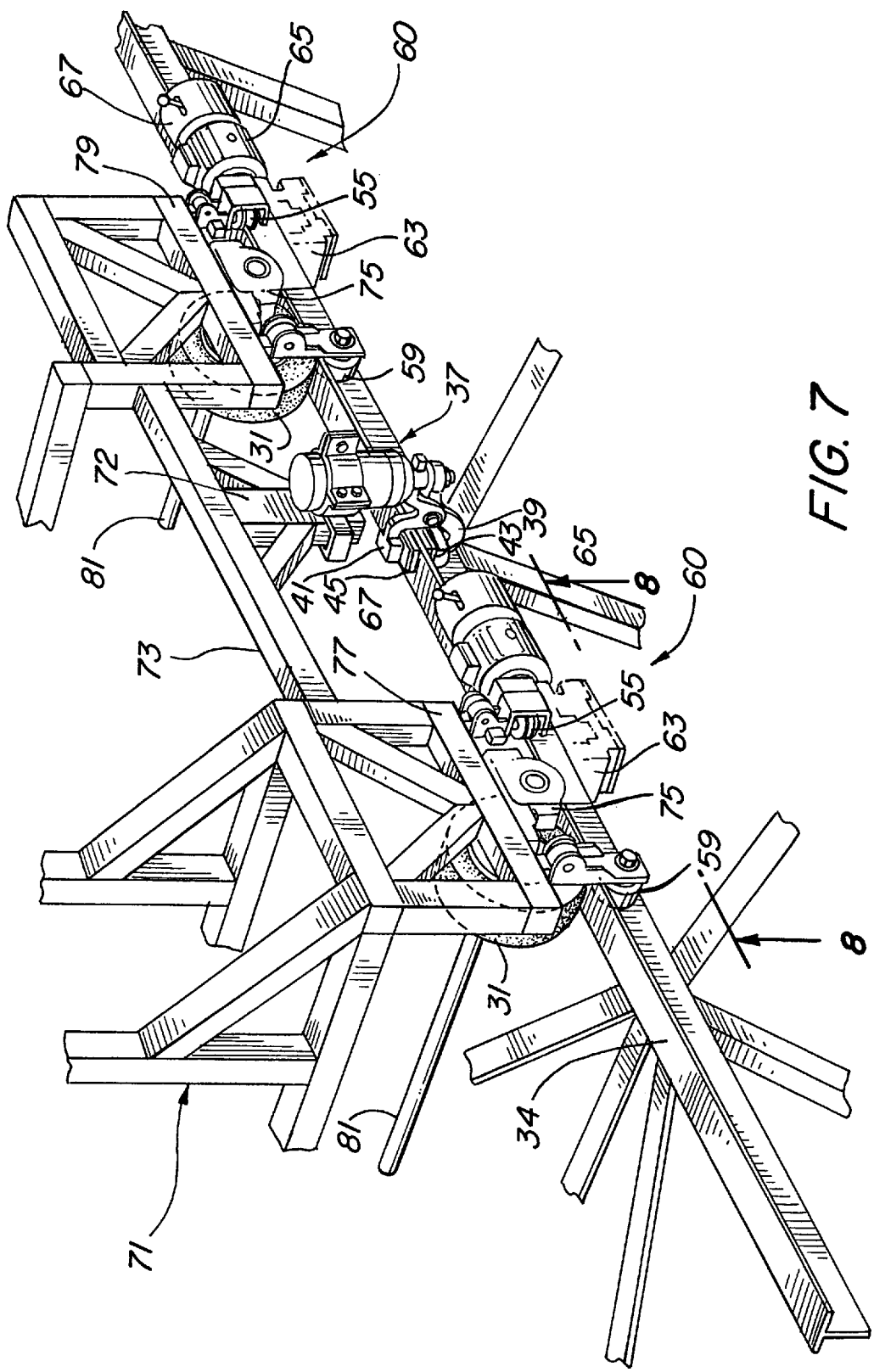
FIG. 7 is a perspective view illustrating presently preferred positioning and mounting of components illustrated in FIGS. 5 and 6.
Figure 8:
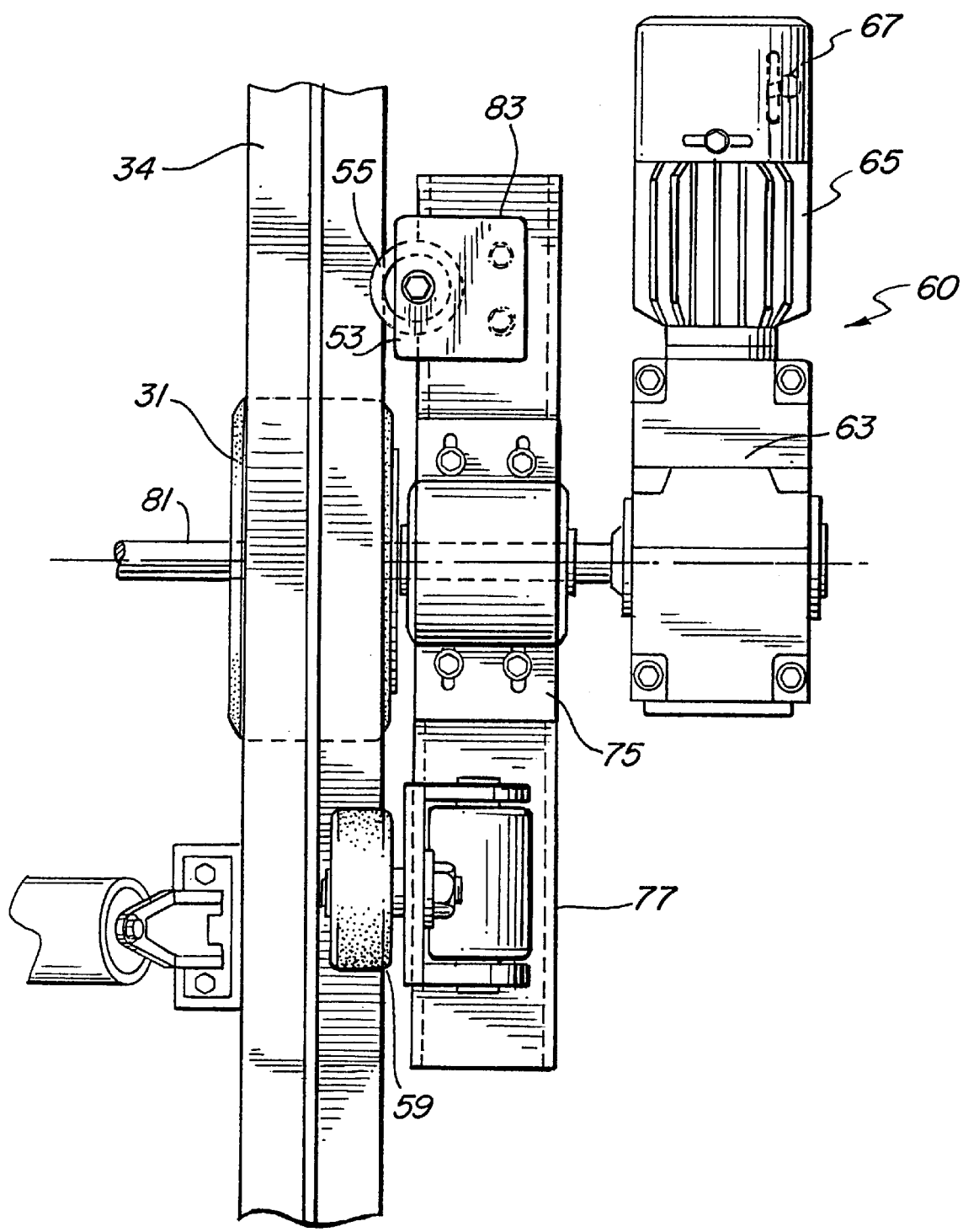
FIG. 8 is a top schematic view taken at 8—8 of FIG. 7.

FIGS. 7 and 8 illustrate a presently preferred scheme for positioning the tracking, propulsion and braking components of FIG. 5 and 6 on a belt tripper structure 71. FIG. 7 illustrates one side of the belt tripper. The opposite side is similarly constructed.

As shown in FIG. 7, a brake assembly 37 is suspended from a horizontal structural member 73 by attachment to a vertical member 72. The brake assembly 37 is centrally positioned between first and second wheel tires 31, which are driven by respective motordrive units 60. These two motordrive units 60 are each attached to the belt tripper structure 71 through use of respective pillow block bearings 75. The bearings 75 are attached to the underside of respective horizontal structural members 77, 79, via bolts, welding or other conventional attachment means.

As best seen in FIG. 8, each caster sidewheel 55 is positioned between the motordrive unit 60 and the structural T-section 34 of the bridge truss. Respective caster mounting brackets 53 are suspended from the respective horizontal members 77, 79 by respective arms 81 which are in turn attached to an adapter bracket or transition bracket 83. The roller wheels 59 are similarly suspended from members 77, 79 and are each positioned spaced apart from and adjacent to a respective pillow block bearing 75.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. The apparatus comprising:
   a conveyer structure, including first and second T-sections; and
   a car adapted to ride on said conveyor structure, said car comprising:
   (a) two pairs of wheel tires positioned to ride on said first and second T-sections respectively, each wheel tire being driven by a respective motor drive unit, each drive unit including an electric motor, an electric motor brake and a shaft-mounted gearbox;
   (b) four caster guide wheels each mounted adjacent a respective one of said wheel tires so as to rotate in a horizontal plane adjacent a vertical edge of one of said first and second T-sections; and
   (c) four roller wheels, each mounted to rotate about an axis parallel to the axis about which said wheel tires rotate and immediately adjacent an underside edge of one of said first and second T-sections.

2. The apparatus of claim 1 further comprising:
   first and second hydraulic caliper brakes each having respective brake shoes positioned to engage a respective one of said T-sections.

3. The apparatus of claim 1 wherein said car comprises a belt tripper.

4. The apparatus of claim 1 wherein said car comprises a hopper.

5. The apparatus comprising:
   a car adapted to ride on first and second T-sections of a conveyer structure, said car comprising two pairs of wheel tires positioned to ride on said first and second T-sections respectively, each wheel tire being driven by a respective motor drive unit, each drive unit including an electric motor, an electric motor brake and a shaft-mounted gearbox.

6. The apparatus of claim 5 wherein said car further comprises:
   four caster guide wheels each mounted adjacent a respective one of said wheel tires so as to rotate in a horizontal plane adjacent a vertical edge of one of said first and second T-sections; and
   four roller wheels, each mounted to rotate about an axis parallel to the axis about which said wheel tires rotate and immediately adjacent an underside edge of one of said first and second T-sections.

7. The apparatus of claim 6 further comprising:
   first and second hydraulic caliper brakes each having respective brake shoes positioned to engage a respective one of said T-sections.

8. The apparatus of claim 5 wherein said car comprises a belt tripper.

9. The apparatus of claim 5 wherein said car comprises a hopper.

* * * * *